(12) United States Patent
Plamondon

(10) Patent No.: US 12,065,978 B2
(45) Date of Patent: Aug. 20, 2024

(54) COMPRESSOR BOOST CONTROL FOR AIRCRAFT ENGINE

(71) Applicant: Pratt & Whitney Canada Corp., Longueuil (CA)

(72) Inventor: Etienne Plamondon, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/978,603

(22) Filed: Nov. 1, 2022

(65) Prior Publication Data

US 2024/0141838 A1 May 2, 2024

(51) Int. Cl.
*F02C 9/20* (2006.01)

(52) U.S. Cl.
CPC .......... *F02C 9/20* (2013.01); *F05D 2220/323* (2013.01); *F05D 2270/301* (2013.01); *F05D 2270/303* (2013.01); *F05D 2270/304* (2013.01); *F05D 2270/3061* (2013.01)

(58) Field of Classification Search
CPC ................. F02C 9/20; F05D 2220/323; F05D 2270/301; F05D 2270/303; F05D 2270/304; F05D 2270/3061
USPC ......................................................... 415/148
See application file for complete search history.

(56) References Cited

U.S. PATENT DOCUMENTS

| | | | |
|---|---|---|---|
| 5,379,583 A | 1/1995 | Zickwolf, Jr. | |
| 8,740,548 B2 | 6/2014 | Rowe | |
| 2011/0296844 A1* | 12/2011 | Widener | F02C 7/22 60/734 |
| 2013/0019607 A1 | 1/2013 | Botarelli | |
| 2014/0090392 A1 | 4/2014 | Meisner | |
| 2014/0182298 A1 | 7/2014 | Krull | |
| 2014/0230446 A1* | 8/2014 | Beutel | F02C 3/34 60/39.23 |
| 2021/0108577 A1 | 4/2021 | Nishant | |
| 2021/0254496 A1 | 8/2021 | Ronnie | |

FOREIGN PATENT DOCUMENTS

| | | | | |
|---|---|---|---|---|
| CN | 102713207 A | * | 10/2012 | ................. F02C 9/00 |
| CN | 103133147 A | * | 6/2013 | ............. F01K 23/10 |

OTHER PUBLICATIONS

Translation—CN-102713207-A (Year: 2023).*
Translation—CN-103133147-A (Year: 2023).*
EP Search Report for EP Patent Application No. 23207288.4 dated Mar. 26, 2024.

* cited by examiner

*Primary Examiner* — J. Todd Newton
(74) *Attorney, Agent, or Firm* — Getz Balich LLC

(57) ABSTRACT

A control method is provided for an engine. During this control method, a lambda target parameter indicative of a ratio between a stoichiometric air-to-fuel ratio and an actual air-to-fuel ratio is determined. A control signal is determined using the lambda target parameter. A component of the engine is operated based on the control signal to regulate airflow within a compressor section of the engine.

18 Claims, 9 Drawing Sheets

COMPRESSOR BOOST CONTROL FOR AIRCRAFT ENGINE

TECHNICAL FIELD

This disclosure relates generally to an aircraft engine and, more particularly, to a control system and method for the aircraft engine.

BACKGROUND INFORMATION

Various systems and methods are known in the art for controlling compressor boost of an aircraft engine such as a turbo-compounded engine or a turbocharged engine. While these known control systems and methods have various benefits, there is still room in the art for improvement. There is need in the art, in particular, for compressor boost control which can optimize engine operation.

SUMMARY

According to an aspect of the present disclosure, a control method is provided for an engine. During this control method, a lambda target parameter indicative of a ratio between a stoichiometric air-to-fuel ratio and an actual air-to-fuel ratio is determined. A control signal is determined using the lambda target parameter. A component of the engine is operated based on the control signal to regulate airflow within a compressor section of the engine.

According to another aspect of the present disclosure, another control method is provided for an aircraft engine. During this control method, a target air density parameter is determined using an engine speed parameter and an engine fuel parameter. An actual air density parameter is determined using a compressor pressure parameter and a compressor temperature parameter. A control signal is determined, where the determining of the control signal includes comparing the target air density parameter to the actual air density parameter. A component of the aircraft engine is operated based on the control signal to regulate airflow within a compressor section of the aircraft engine.

According to still another aspect of the present disclosure, a powerplant is provided. This powerplant includes an aircraft engine and a control system. The aircraft engine includes a compressor section and a component configured to regulate airflow within the compressor section based on a control signal. The control system is configured to: determine a lambda target parameter indicative of a ratio between a stoichiometric air-to-fuel ratio and an actual air-to-fuel ratio; and determine the control signal using the lambda target parameter.

The determining of the target air density parameter may include determining a lambda target parameter based on the engine speed parameter and the engine fuel parameter. The lambda target parameter may be indicative of a ratio between a stoichiometric air-to-fuel ratio and an actual air-to-fuel ratio.

The compressor pressure parameter may be indicative of a pressure of the airflow at the compressor section. The compressor temperature parameter may be indicative of a temperature of the airflow at the compressor section.

The control system may be configured to: determine a target air density parameter using the lambda target parameter; determine an actual air density parameter using a compressor pressure parameter and a compressor temperature parameter; compare the target air density parameter to the actual air density parameter to provide a difference parameter; and process the difference parameter to determine the control signal.

The control system may be configured to: determine a target mass air parameter using the lambda target parameter, a stoichiometric air-to-fuel ratio parameter and an engine fuel parameter; determine an actual mass air parameter using the engine fuel parameter and an engine speed parameter; and process the target mass air parameter with the actual mass air parameter to determine the target air density.

The component may be configured as or otherwise include a variable vane.

The variable vane may be configured as or otherwise include a compressor inlet guide vane.

The component may be configured as or otherwise include a blowoff valve.

The component may be configured as or otherwise include a variable transmission.

The lambda target parameter may be determined based on an engine speed parameter and an engine fuel parameter.

The determining of the control signal may include determining a target air density parameter using the lambda target parameter.

The determining of the target air density parameter may include: determining a target mass air parameter using the lambda target parameter, a stoichiometric air-to-fuel ratio parameter and an engine fuel parameter; determining an actual mass air parameter using the engine fuel parameter and an engine speed parameter; and processing the target mass air parameter with the actual mass air parameter to determine the target air density.

The actual mass air parameter may be determined using an engine displacement volume parameter.

The determining of the control signal may also include: determining an actual air density parameter; and comparing the target air density parameter to the actual air density parameter to provide a difference parameter.

The actual air density parameter may be based on a compressor pressure parameter and a compressor temperature parameter.

The determining of the control signal may also include processing the difference parameter with a correction factor parameter.

The control method may also include: determining a second control signal; and operating a second component of the engine based on the second control signal to regulate a temperature of the airflow within the compressor section.

The second control signal may be determined using a temperature control loop independent from a lambda control loop used for the determining of the control signal.

The engine may be configured as or otherwise include a gas turbine engine, a turbo-compounded engine or a turbocharged engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
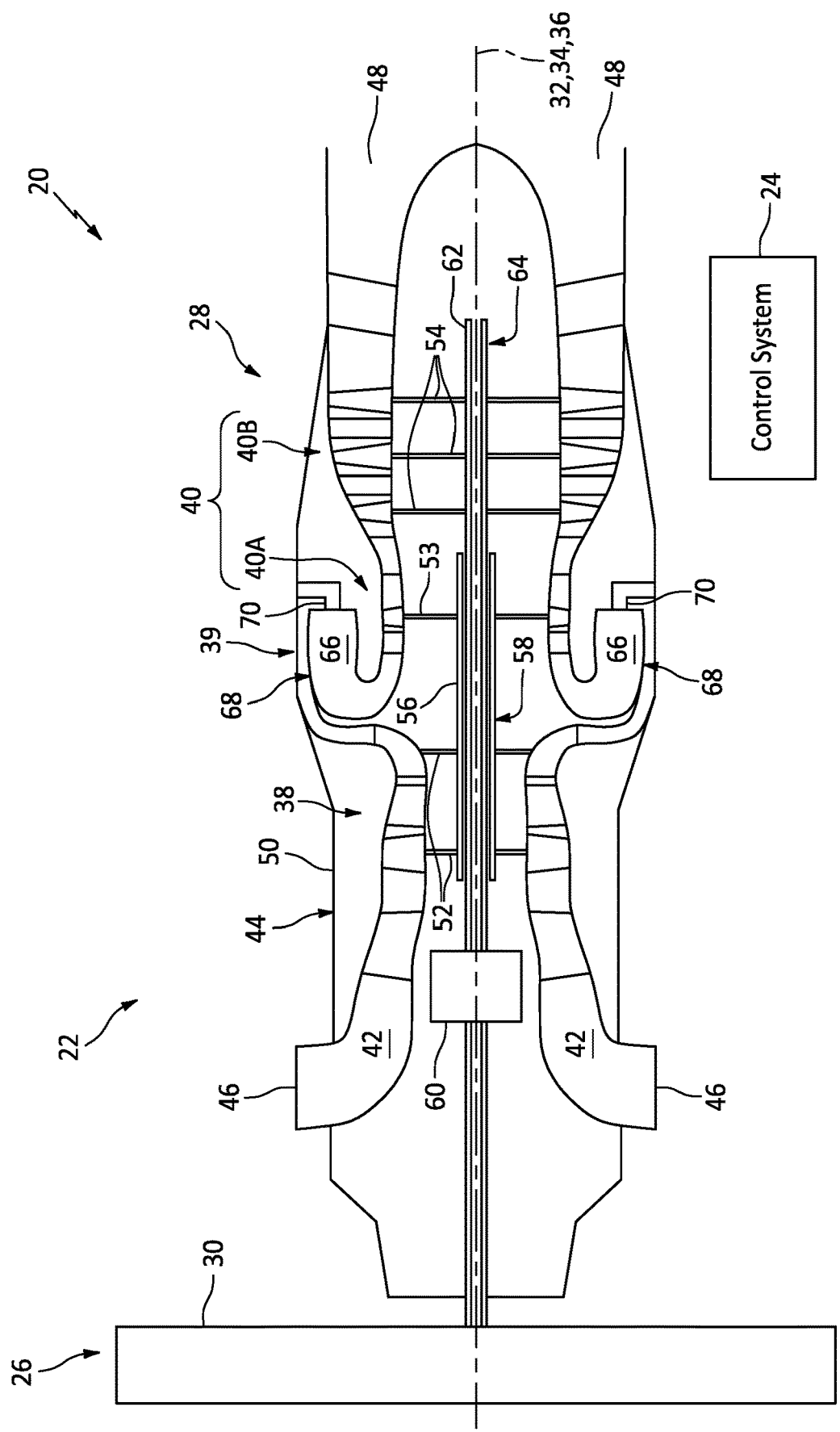
FIG. 1 is a schematic side sectional illustration of a powerplant with a gas turbine engine.

FIG. 1 is a schematic side sectional illustration of a gas turbine engine powerplant 20 for an aircraft. This powerplant 20 includes an engine 22 and a system 24 for controlling operation of the engine 22. The engine 22 of FIG. 1 includes a mechanical load 26 and an engine core 28. For ease of description, the engine 22 may be described below and referred to as a gas turbine engine, and the engine core 28 may be described below and referred to as a gas turbine engine core. The present disclosure, however, is not limited to gas turbine engine applications. In particular, the engine 22 and its core 28 may alternatively be configured as/included in a turbo-compounded engine, a turbocharged engine or any other engine system which receives boost/compressed air.

The mechanical load 26 may be configured as or otherwise include at least (or only) one driven rotor 30. This driven rotor 30 may be a bladed propulsor rotor where the powerplant 20 is part of an aircraft propulsion system. The driven rotor 30, for example, may be a propeller rotor where the gas turbine engine 22 is configured as a turboprop gas turbine engine. The driven rotor 30 may be a fan rotor where the gas turbine engine 22 is configured as a turbofan gas turbine engine. The driven rotor 30 may be a compressor rotor where the gas turbine engine 22 is configured as a turbojet gas turbine engine. The driven rotor 30 may be a helicopter rotor (e.g., a main rotor) where the gas turbine engine 22 is configured as a turboshaft gas turbine engine. The present disclosure, however, is not limited to the foregoing exemplary gas turbine engine applications. Furthermore, the present disclosure is not limited to aircraft propulsion system applications. The driven rotor 30, for example, may alternatively be a generator rotor where the powerplant 20 is part of a power generation system for an aircraft or non-aircraft application; e.g., an auxiliary power unit (APU) or an industrial powerplant.

The engine core 28 of FIG. 1 extends axially along an axial centerline 32 of the engine core 28. This axial centerline 32 may be coaxial with a rotational axis 34 of one or more rotors included in the engine core 28. The axial centerline 32 may also be parallel with (e.g., coaxial or offset from) a rotational axis 36 of the driven rotor 30. The engine core 28 of FIG. 1 includes a compressor section 38, a combustor section 39 and a turbine section 40. The turbine section 40 includes a high pressure turbine (HPT) section 40A and a low pressure turbine (LPT) section 40B.

The engine sections 38, 39, 40A and 40B are arranged sequentially along a (e.g., annular) core flowpath 42 and within an engine housing 44. This core flowpath 42 extends longitudinally within the engine core 28 from an upstream airflow inlet 46 into the engine core 28 to a downstream airflow exhaust 48 from the engine core 28. Here, the airflow inlet 46 is also an inlet into the gas turbine engine 22 and the exhaust 48 is also an exhaust from the gas turbine engine 22; however, the present disclosure is not limited to such an exemplary arrangement. The engine housing 44 of FIG. 1 includes an engine case 50 (e.g., a core case) housing the compressor section 38, the combustor section 39 and the turbine section 40.

The compressor section 38, the HPT section 40A and the LPT section 40B each include one or more bladed rotors 52-54. Each of these bladed rotors 52-54 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 52 is connected to and driven by the HPT rotor 53 through a high speed shaft 56. At least (or only) the compressor rotor 52, the HPT rotor 53 and the high speed shaft 56 may collectively form a high speed rotating structure 58 that is rotatable about the rotational axis 34. The driven rotor 30 of FIG. 1 is connected to an output of a geartrain 60. An input of the geartrain 60 is connected to the LPT rotor 54 through a low speed shaft 62. At least (or only) the LPT rotor 54 and the low speed shaft 62 may collectively form a low speed rotating structure 64 that is rotatable about the rotational axis 34. Each of the engine shafts 56, 62 are rotatably supported by a plurality of bearings (not shown in FIG. 1 for ease of illustration). Each of these bearings is connected to the engine housing 44 by an internal engine support structure.

During gas turbine engine operation, air enters the engine core 28 through the airflow inlet 46 and enters the core flowpath 42. The air within the core flowpath 42 may be referred to as "core air". This core air is compressed by the compressor rotor 52 and directed into a (e.g., annular) combustion chamber 66 of a (e.g., annular) combustor 68 in the combustor section 39. Fuel is injected into the combustion chamber 66 through one or more fuel injectors 70 and mixed with the compressed core air to provide a fuel-air mixture. This fuel-air mixture is ignited and combustion products thereof flow through and sequentially cause the HPT rotor 53 and the LPT rotor 54 to rotate. The rotation of the HPT rotor 53 drives rotation of the compressor rotor 52 and, thus, compression of the air received from the airflow inlet 46. The rotation of the LPT rotor 54 drives rotation of the driven rotor 30. Where the driven rotor 30 is the bladed propulsor rotor, the rotation of the driven rotor 30 may propel additional air through or along and outside of the gas turbine engine 22. Where the driven rotor 30 is the generator rotor, the rotation of the driven rotor 30 may facilitate generation of electrical power.

Figure 2:
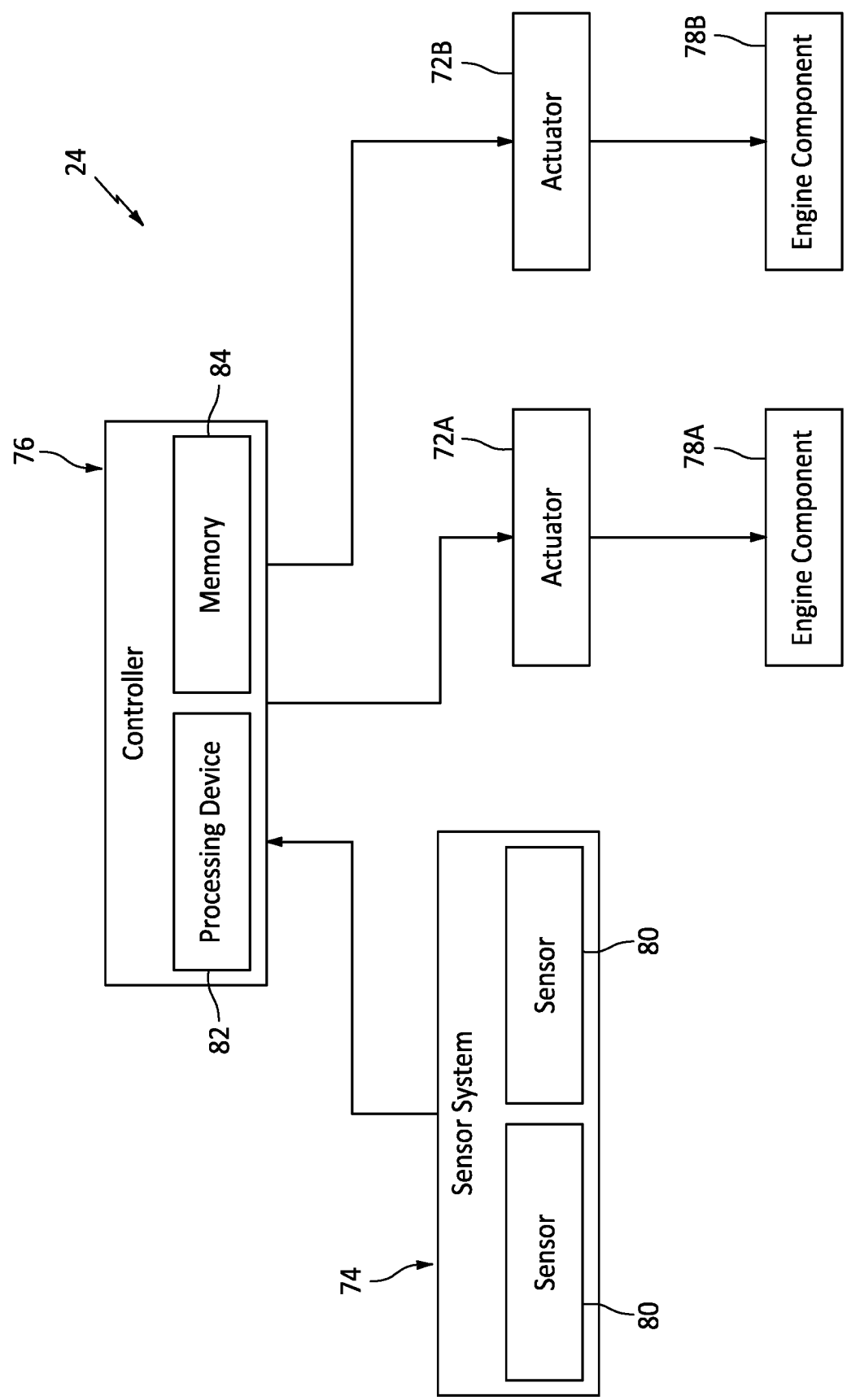
FIG. 2 is a schematic illustration of a control system for the gas turbine engine.

Referring to FIG. 2, the control system 24 includes one or more engine actuators 72A and 72B (generally referred to as "72"), a sensor system 74 and a controller 76. Each of the engine actuators 72 may be configured as or otherwise include a motor, a switch, a valve and/or a pump. Each of the engine actuators 72 is configured to control operation of at least one respective component of the gas turbine engine 22. Each engine actuator 72, for example, may move (e.g., rotating, translate and/or otherwise rearrange), open, close, activate, de-active and/or otherwise adjust operation of the respective engine component 78A, 78B (generally referred to as "78").

The first engine component 78A may be configured to regulate (e.g., increase, decrease and/or maintain) airflow into, within and/or out of the compressor section 38. The first engine component 78A, for example, may be configured as or otherwise include a variable vane; e.g., a compressor inlet guide vane, a compressor outlet guide vane, etc. This variable vane may be one of a plurality of variable vanes in a vane array controlled by the first engine actuator 72A. In another example, the first engine component 78A may be configured as a blowoff valve for the compressor section 38. This blowoff valve may be configured to selectively bleed off compressed core air from the compressor section 38. In still another example, the first engine component 78A may be configured as a variable transmission between the compressor rotor 52 and the HPT rotor 53, or a variable transmission (e.g., the geartrain 60) between the driven rotor 30 and the LPT rotor 54 where the driven rotor 30 (e.g., the fan rotor) propels the air into the airflow inlet 46. The present disclosure, however, is not limited to the foregoing exemplary first engine component configurations. For example, in other embodiments, the first engine component 78A may alternatively be configured as a wastegate.

The second engine component 78B may be configured to regulate (e.g., increase, decrease and/or maintain) temperature of the airflow into, within and/or out of the compressor section 38. The second engine component 78B, for example, may be configured as or otherwise include a heat exchanger such as, but not limited to, an intercooler.

The sensor system 74 is configured to measure one or more parameters and provide sensor data indicative of the one or more measured parameters. Examples of these parameters include, but are not limited to:

- an ambient temperature parameter (T_AMB) indicative of a temperature of the air outside of the gas turbine engine 22;
- an inlet temperature parameter (T_IN) indicative of a temperature of the air entering the gas turbine engine 22 and/or its engine core 28 (e.g., a T1 temperature parameter);
- a compressor temperature parameter (T_COMP) indicative of a temperature of the core air entering, within or exiting the compressor section 38 (e.g., a T35 temperature parameter);
- an ambient pressure parameter (P_AMB) indicative of a pressure of the air outside of the gas turbine engine 22;
- an inlet pressure parameter (P_IN) indicative of a pressure of the air entering the gas turbine engine 22 and/or its engine core 28;
- a compressor pressure parameter (P_COMP) indicative of a pressure of the core air entering, within or exiting the compressor section 38 (e.g., a P35 temperature parameter); and
- an engine speed parameter (N) indicative of a speed at which an engine rotating structure (e.g., the high speed rotating structure 58) is rotating.

The sensor system 74 may include one or more sensors 80 (two shown for ease of illustration) to measure the various measured parameters. Examples of these sensors 80 include, but are not limited to, temperature sensor(s), pressure sensor(s) and speed sensor(s). It is contemplated, however, one or more of the parameters may also or alternatively be estimated by the controller 76; e.g., synthesized, computationally determined, retrieved from a lookup table, etc. This operability may be particularly useful during an unlikely circumstance of, for example, one or more of the sensors 80 malfunctioning—the parameter(s) may be estimated to facilitate continued gas turbine engine operation. Of course, one or more of the parameters may also be estimated to reduce sensor system complexity and/or cost.

The controller 76 is in signal communication (e.g., hardwired and/or wirelessly coupled) with the actuators 72 as well as the sensor system 74 and its sensors 80. The controller 76 may be implemented with a combination of hardware and software. The hardware may include a processing device 82 and a memory 84, which processing device 82 may include one or more single-core and/or multi-core processors. The hardware may also or alternatively include analog and/or digital circuitry other than that described above.

The memory 84 is configured to store software (e.g., program instructions) for execution by the processing device 82, which software execution may control and/or facilitate performance of one or more operations such as those described in the methods below. The memory 84 may be a non-transitory computer readable medium. For example, the memory 84 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
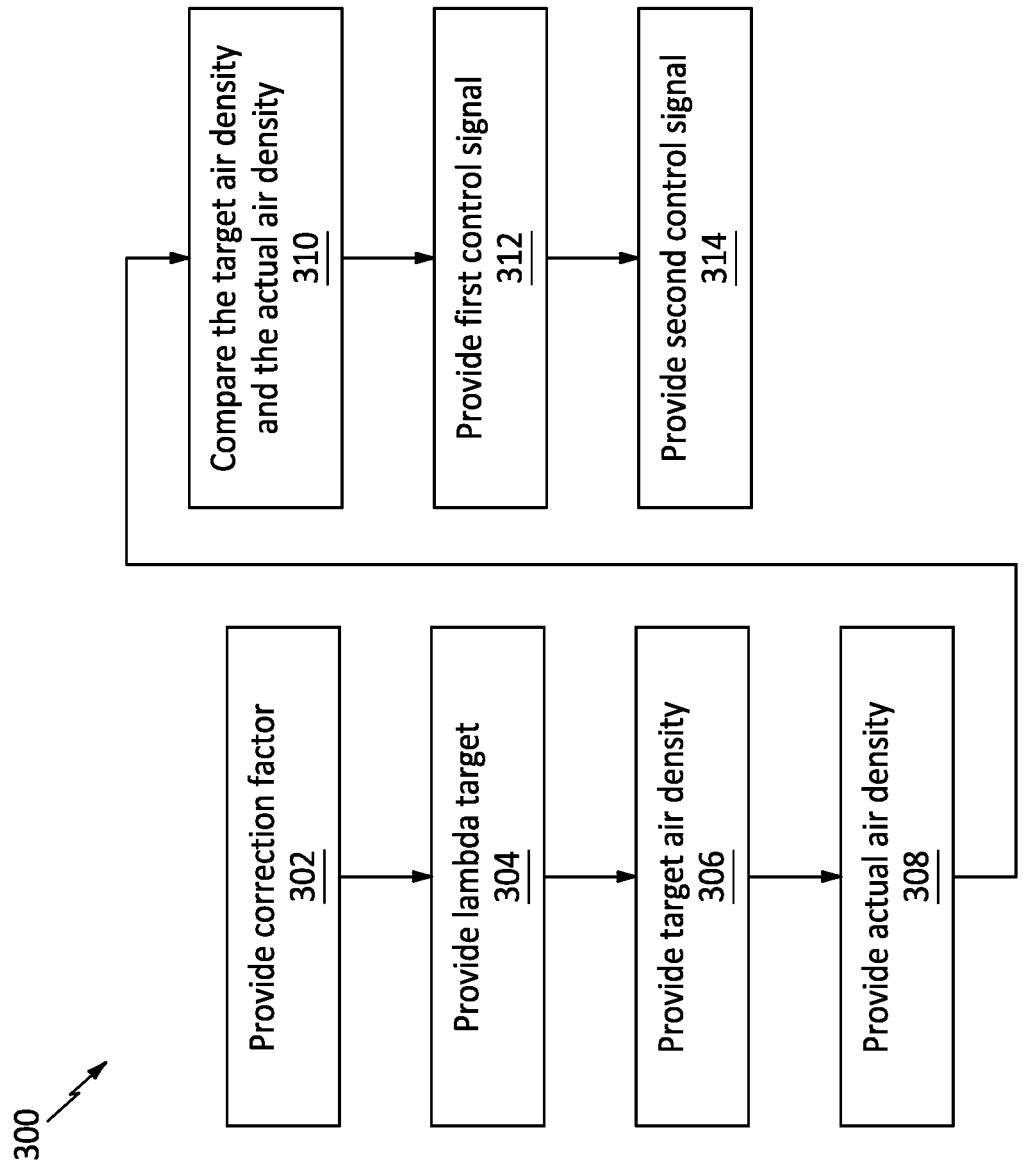
FIG. 3 is a flow diagram of a control method for the gas turbine engine.

FIG. 3 is a flow diagram of a control method 300 for a gas turbine engine such as the gas turbine engine 22 of FIG. 1. For ease of description, the control method 300 is described with reference to the control system 24 of FIG. 2. The control method 300, however, is not limited to utilizing such an exemplary control system.

Figure 4:
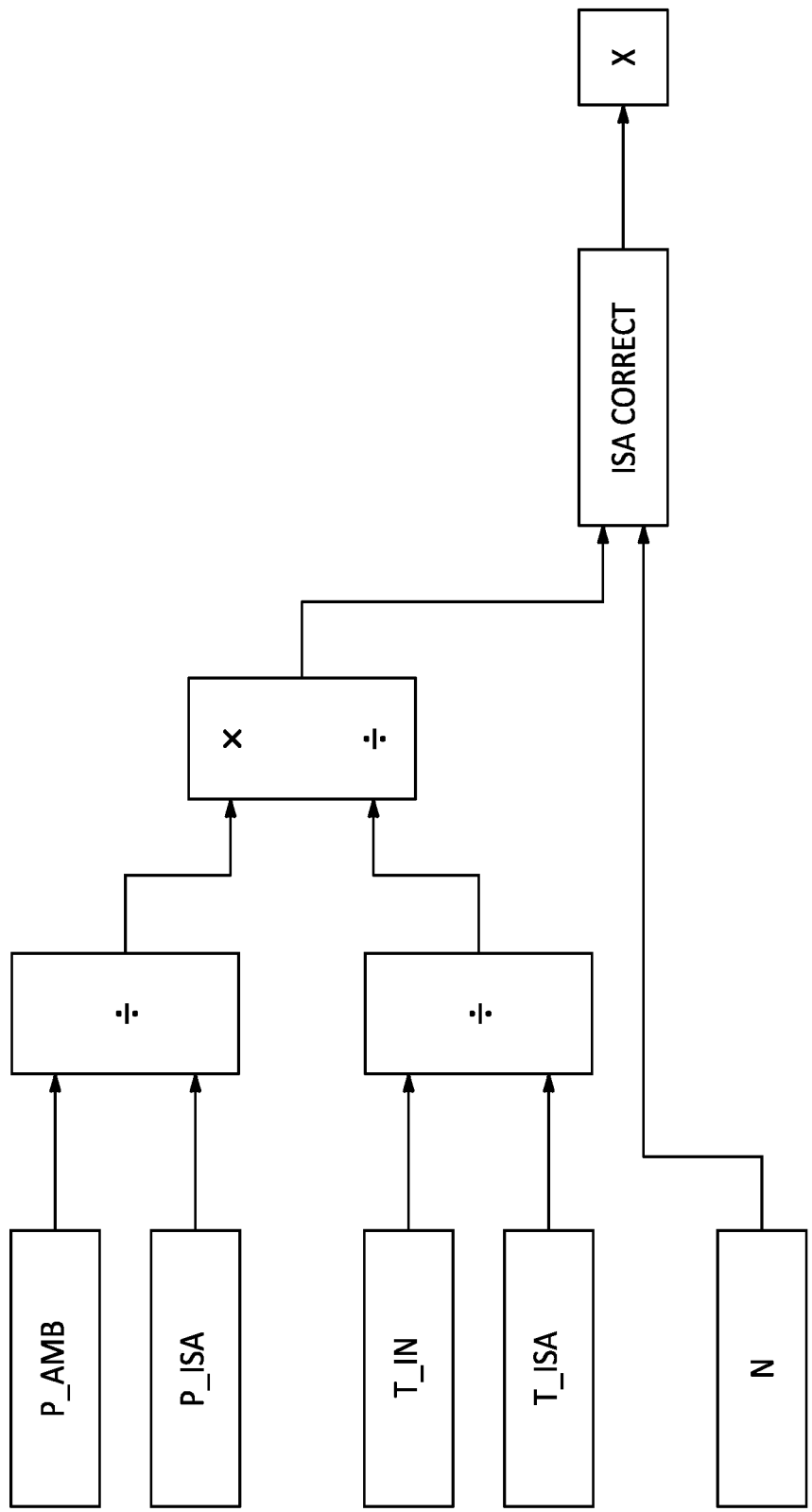
FIGS. 4-9 are schematic illustrations of various sections of a lambda control loop for determining a control signal for a first component of the gas turbine engine.

In step 302, a correction factor parameter (X) is provided using, for example, the controller 76. For example, referring to FIG. 4, the ambient pressure parameter (P_AMB) may be processed with (e.g., divided by) an international standard atmospheric (ISA) pressure (P ISA) to provide a first output, where the ambient pressure parameter may be measured or estimated. The inlet temperature parameter (T_IN) may be processed with (e.g., divided by) an international standard atmospheric (ISA) temperature (T ISA) to provide a second output. The first output may be processed with (e.g., divided by) the second output to provide a third output. This third output and an engine speed parameter (N) may be processed (e.g., using a look up table) to determine the correction factor parameter (X). The engine speed parameter (N) may correspond to a control request; e.g., a pilot input, a powerplant operator input, etc.

Figure 5:
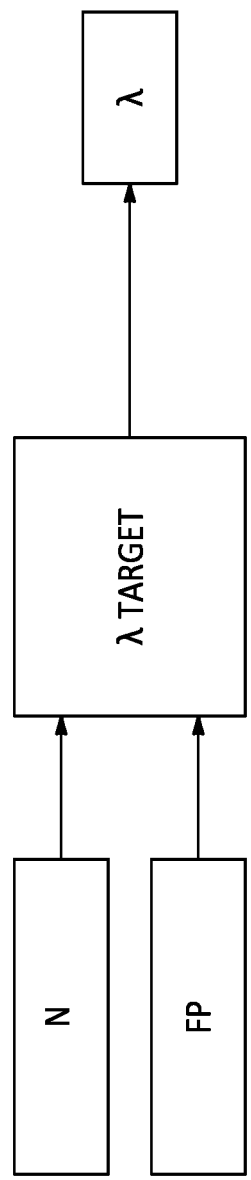

In step 304, a lambda target parameter (λ) is provided using, for example, the controller 76. For example, referring to FIG. 5, the engine speed parameter (N) and an engine fuel parameter (FP) may be processed to determine the lambda target parameter (λ), where the engine speed parameter (N) and/or the engine fuel parameter (FP) may correspond to the control request; e.g., the pilot input, the powerplant operator input, etc. A lookup table (or other technique) may be used to determine a mass air parameter ($m_{air}$) associated with the requested engine speed parameter (N). Similarly, a lookup table (or other technique) may be used to determine a mass fuel parameter ($m_{fuel}$) associated with the requested engine fuel parameter (FP). The lambda target parameter (λ) may be determined within a k target module using the following equation:

$$\lambda = \frac{m_{air}/m_{fuel}}{14.7}$$

By determining the lambda target parameter (λ) as described above, the control method 300 may obviate a need for a physical sensor such as a lambda sensor or a mass air flow (MAF) sensor located in communication with the core flowpath 42. Such sensors may be difficult to implement in high temperature environments and/or may have relatively low reliability. Furthermore, determining the lambda target parameter (λ) as described above may reduce sensor hardware requirements for the engine 22. Of course, it is contemplated that such physical sensor(s) may alternatively be provided, for example, for redundancy purposes.

Figure 6:
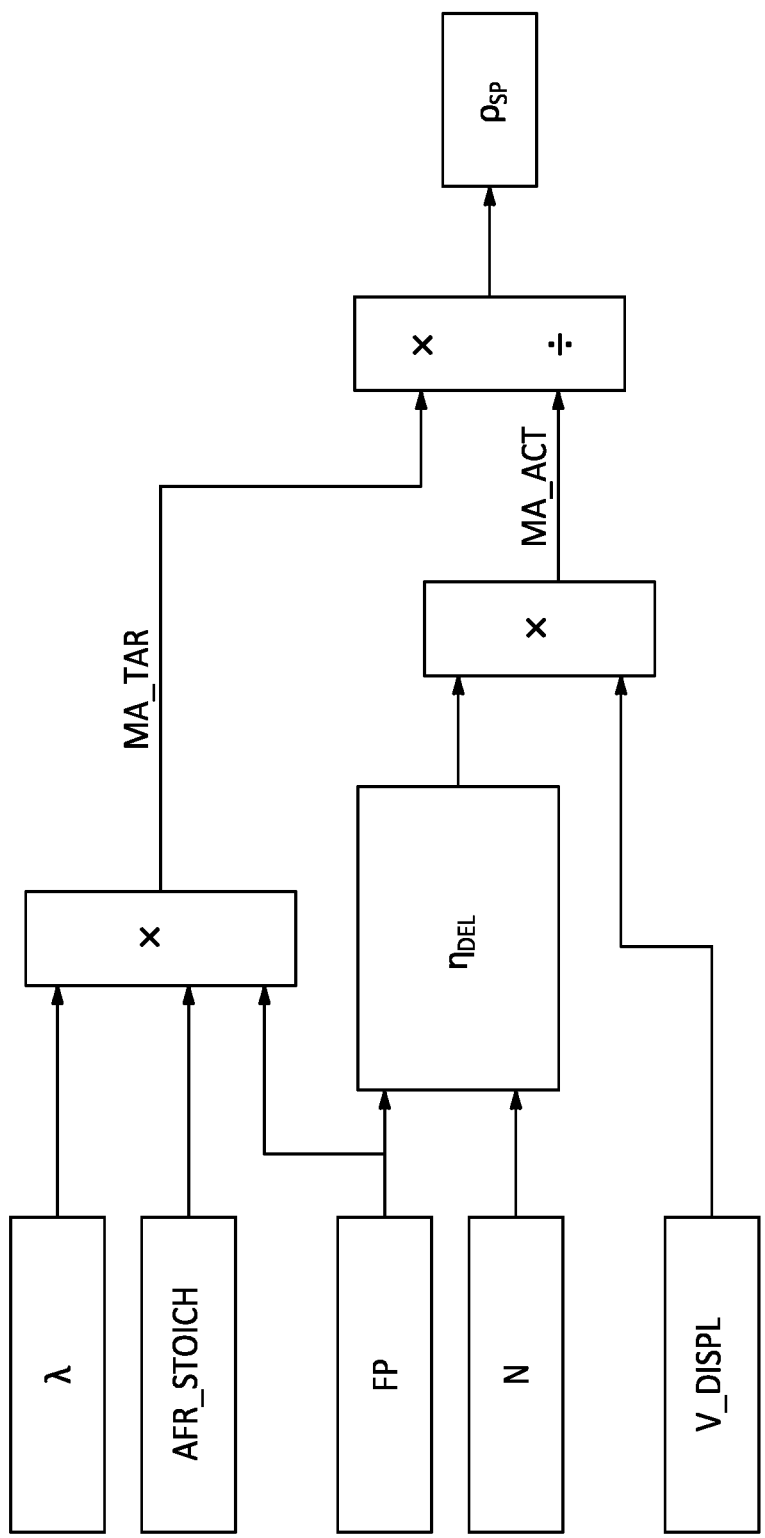

In step 306, a target air density parameter ($\rho_{sp}$) is provided using, for example, the controller 76. For example, referring to FIG. 6, the lambda target parameter (λ), the requested engine fuel parameter (FP) and a stoichiometric air-to-fuel ratio (AFR) constant (AFR_STOICH) may be processed (e.g., multiplied) to determine a target mass air parameter (MA_TAR). The requested engine fuel parameter (FP) and the requested engine speed parameter (N) may be processed to determine an actual mass air parameter (MA_ACT). More particularly, the requested engine fuel parameter (FP) and the requested engine speed parameter (N) may be processed to determine an air delivery ratio parameter ($\eta_{DEL}$). This air delivery ratio parameter ($\eta_{DEL}$) and a volumetric displacement parameter (V_DISPL) (or a compressor map) of the compressor section 38 may be processed (e.g., multiplied) to determine the actual mass air parameter (MA_ACT). Here, the volumetric displacement parameter (or compressor map) is an air delivery ratio representing an ability of the engine to intake air under specific conditions. The target mass air parameter (MA_TAR) may be processed with (e.g., divided by) the actual mass air parameter (MA_ACT) to determine the target air density parameter ($\rho_{sp}$).

Figure 7:
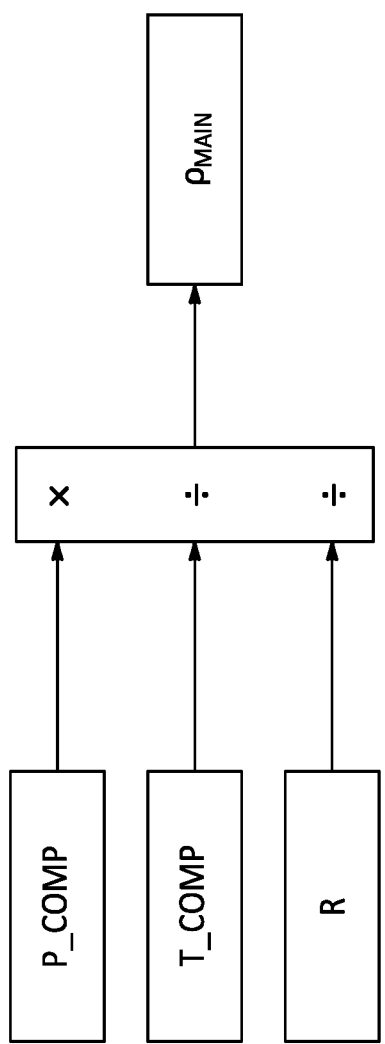

In step 308, an actual air density parameter ($\rho_{MAIN}$) is provided using, for example, the controller 76. For example, referring to FIG. 7, the compressor pressure parameter (P_COMP) and the compressor temperature parameter (T_COMP) may be processed to determine the actual air density parameter ($\rho_{MAIN}$). More particularly, the compressor pressure parameter (P_COMP) may be divided by the compressor temperature parameter (T_COMP) and an ideal gas constant (R) to determine the actual air density parameter ($\rho_{MAIN}$).

Figure 8:
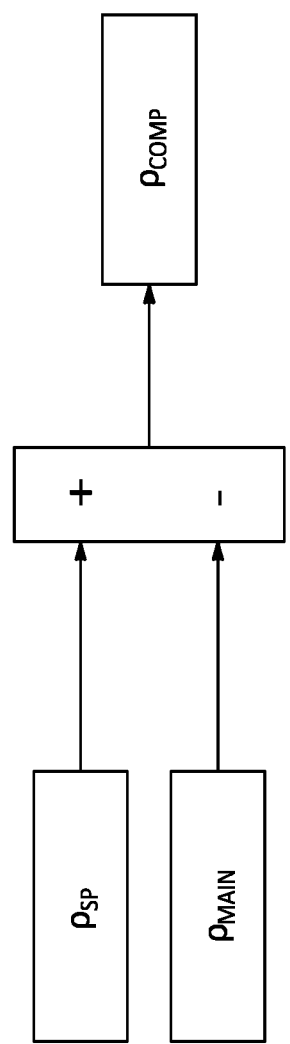

In step 310, the target air density parameter ($\rho_{sp}$) is compared to the actual air density parameter ($\rho_{MAIN}$) using, for example, the controller 76. For example, referring to FIG. 8, the actual air density parameter ($\rho_{MAIN}$) may be subtracted from the target air density parameter ($\rho_{sp}$) to determine a difference parameter ($\rho_{comp}$).

Figure 9:
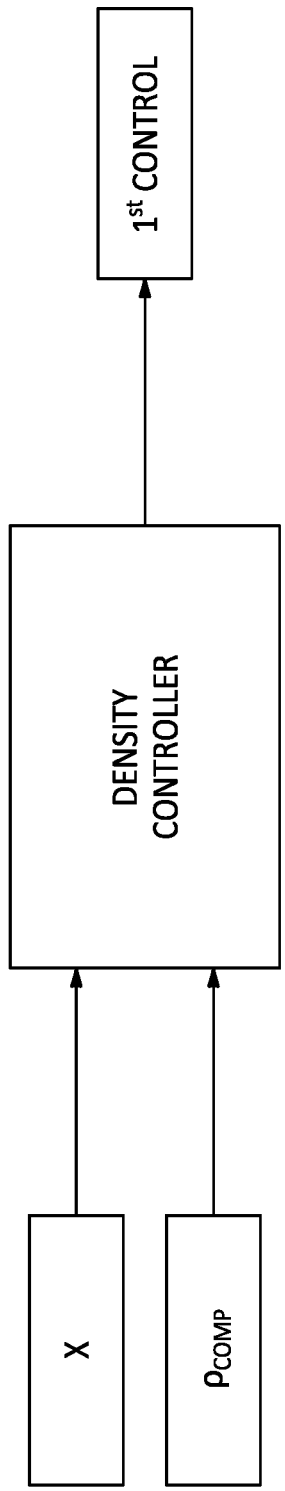

In step 312, a first control signal is provided using, for example, the controller 76. For example, referring to FIG. 9, the difference parameter ($\rho_{comp}$) may be processed with the correction factor parameter (λ) using a density control logic to determine the first control signal. The controller 76 may then communicate this first control signal to the first engine actuator 72A to operate the first engine component 78A. In this manner, the control system 24 is operable to regulate airflow within/through the compressor section 38 utilizing the lambda target parameter (λ) and a closed lambda control loop (e.g., see FIGS. 4-9). More particularly, the lambda control loop may target a given lambda parameter for given operating points based on the engine speed parameter (N) and the engine fuel parameter (FP) requested by the aircraft pilot/engine operator. The lambda control loop may then adjust compressor section operation such that the targeted lambda parameter is gradually approached.

Figure 10:
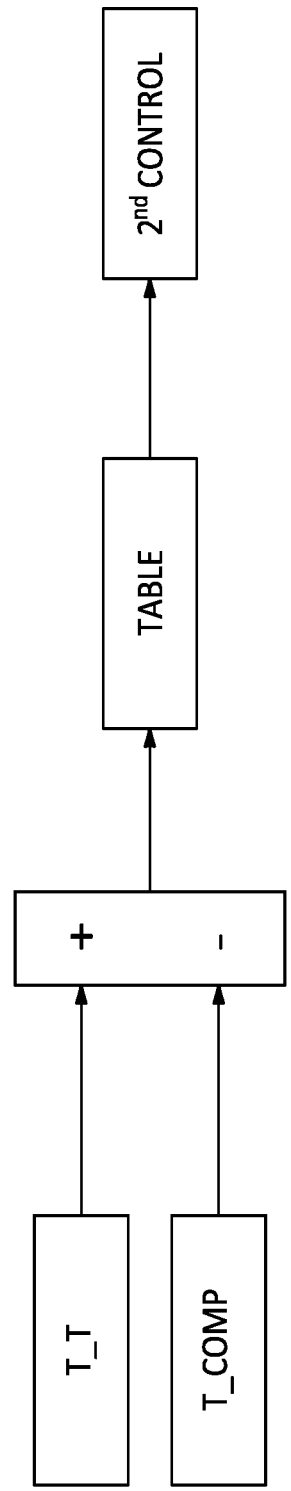
FIG. 10 is a schematic illustration of a temperature control loop for determining a control signal for a second component of the gas turbine engine.

Adjustments to the first engine component 78A (e.g., increasing, decreasing and/or maintaining compressor section boost) may impact core air temperature and/or pressure. A parallel and/or independent temperature control loop may therefore be utilized to control the core air temperature within the compressor section 38. In particular, in step 314, a second control signal is provided using, for example, the controller 76. For example, referring to FIG. 10, the compressor temperature parameter (T_COMP) may be compared to a target compressor temperature parameter (T_T). A look up table (or other technique) may be used to determine the second control signal based on a difference between the compressor temperature parameter (T_COMP) and target compressor temperature parameter (T_T). The controller 76 may then communicate this second control signal to the second engine actuator 72B to operate the second engine component 78B. As this temperature control loop gradually reaches its target compressor temperature parameter (T_T), the parallel/independent lambda control loop may continue to self-adjust a setpoint of the compressor section 38 to maintain lambda.

Using the parallel/independent lambda and temperature control loops, the control system 24 may improve operation of the first engine component 78A; e.g., inlet guide vane position. This in turn may increase operational efficiency of the gas turbine engine 22. Furthermore, during transient conditions, the parallel control loops may help to maintain a stable combustion region within the combustor section 39 while maintaining the turbine section 40 (e.g., the HPT section 40A and/or the LPT section 40B) within its operating limits.

Figure 11:
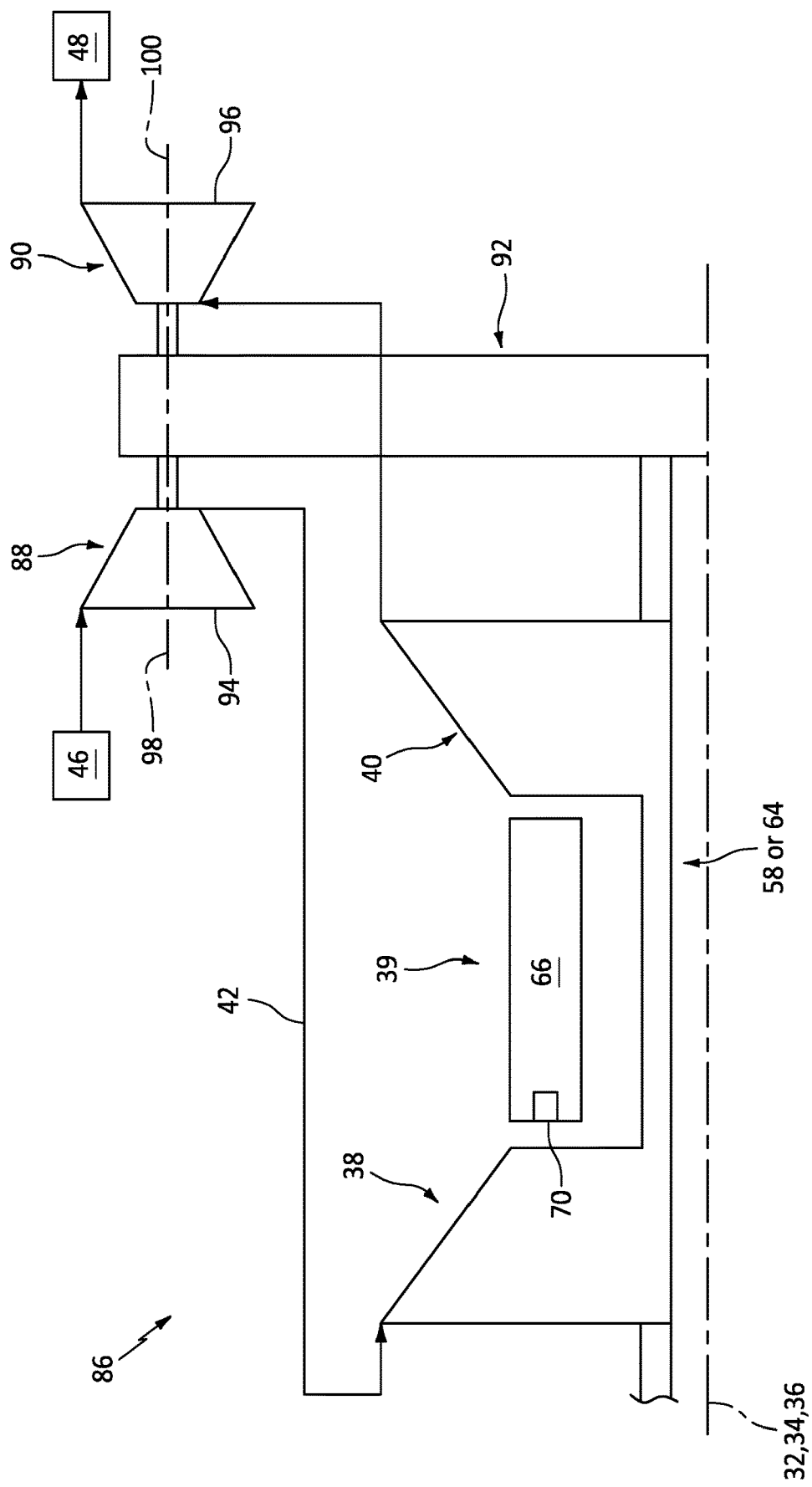
FIG. 11 is a partial schematic illustration of a turbo-compounded engine.

The control system 24 and the control loops may be used for various gas turbine engines other than the one described above. The control system 24 and the control loops, for example, may be used with a geared gas turbine engine where a gear train connects one or more shafts to one or more rotors in a fan section, a compressor section and/or any other engine section. Alternatively, the control system 24 and the control loops may be used with a direct drive gas turbine engine configured without a gear train. The gas turbine engine may be configured with a single spool, with two spools (e.g., see FIG. 1), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, the present disclosure is not limited to gas turbine engine applications. The control system 24 and the control loops, for example, may be used for a turbo-compounded engine, a turbocharged engine or any other engine system which receives boost/compressed air. For example, referring to FIG. 11, the engine 22 and its core 28 may alternatively be configured as/included in a turbo-compounded engine 86. This turbo-compounded engine 86 includes a secondary compressor section 88, a secondary turbine section 90 and a gearbox 92. The compressor section 88 includes a bladed compressor rotor 94 and the turbine section 90 includes a bladed turbine rotor 96. Each of these bladed rotors 94, 96 includes a plurality of rotor blades arranged circumferentially around and connected to one or more respective rotor disks. The compressor rotor 94 is rotatable about a compressor axis 98. The turbine rotor 96 is rotatable about a turbine axis 100, which turbine axis 100 may be parallel (e.g., coaxial) with the compressor axis 98. The turbine rotor 96 is coupled to the compressor rotor 94 through the gearbox 92; however, the turbine rotor 96 may alternatively be coupled directly to the compressor rotor 94 by a common shaft. The turbine rotor 96 is further coupled to an internal rotating structure (e.g., the rotating structure 58 or 64) of the engine core 28 through the gearbox 92. With this configuration, the core flowpath 42 extends from the inlet 46, sequentially through at least the elements 88, 38, 39, 40 and 90, to the exhaust 48. Note, while the engine core 28 is shown as a gas turbine engine core in FIG. 11, it is contemplated this engine core may alternatively be a reciprocating piston engine, a rotary engine, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A control method for an engine, comprising:
   determining a lambda target parameter indicative of a ratio between a stoichiometric air-to-fuel ratio and an actual air-to-fuel ratio;
   determining a control signal using the lambda target parameter;
   operating a component of the engine based on the control signal to regulate airflow within a compressor section of the engine;
   determining a second control signal; and
   operating a second component of the engine based on the second control signal to regulate a temperature of the airflow within the compressor section.

2. The control method of claim 1, wherein the component comprises a variable vane.

3. The control method of claim 2, wherein the variable vane comprises a compressor inlet guide vane.

4. The control method of claim 1, wherein the component comprises a blowoff valve.

5. The control method of claim 1, wherein the component comprises a variable transmission.

6. The control method of claim 1, wherein the lambda target parameter is determined based on an engine speed parameter and an engine fuel parameter.

7. The control method of claim 1, wherein the determining of the control signal comprises determining a target air density parameter using the lambda target parameter.

8. A control method for an engine, comprising:
   determining a lambda target parameter indicative of a ratio between a stoichiometric air-to-fuel ratio and an actual air-to-fuel ratio;
   determining a control signal using the lambda target parameter;
   operating a component of the engine based on the control signal to regulate airflow within a compressor section of the engine;
   wherein the determining of the control signal comprises determining a target air density parameter using the lambda target parameter;
   wherein the determining of the target air density parameter comprises
   determining a target mass air parameter using the lambda target parameter, a stoichiometric air-to-fuel ratio parameter and an engine fuel parameter;
   determining an actual mass air parameter using the engine fuel parameter and an engine speed parameter; and
   processing the target mass air parameter with the actual mass air parameter to determine the target air density.

9. The control method of claim 8, wherein the actual mass air parameter is further determined using an engine displacement volume parameter.

10. A control method for an engine, comprising:
    determining a lambda target parameter indicative of a ratio between a stoichiometric air-to-fuel ratio and an actual air-to-fuel ratio;
    determining a control signal using the lambda target parameter;
    operating a component of the engine based on the control signal to regulate airflow within a compressor section of the engine;
    wherein the determining of the control signal comprises determining a target air density parameter using the lambda target parameter;
    wherein the determining of the control signal further comprises
    determining an actual air density parameter; and
    comparing the target air density parameter to the actual air density parameter to provide a difference parameter.

11. The control method of claim 10, wherein the actual air density parameter is based on a compressor pressure parameter and a compressor temperature parameter.

12. The control method of claim 10, wherein the determining of the control signal further comprises processing the difference parameter with a correction factor parameter.

13. The control method of claim 1, wherein the second control signal is determined using a temperature control loop independent from a lambda control loop used for the determining of the control signal.

14. A control method for an aircraft engine, comprising:
    determining a target air density parameter using an engine speed parameter and an engine fuel parameter;
    determining an actual air density parameter using a compressor pressure parameter and a compressor temperature parameter;
    determining a control signal, the determining of the control signal comprising comparing the target air density parameter to the actual air density parameter; and
    operating a component of the aircraft engine based on the control signal to regulate airflow within a compressor section of the aircraft engine.

15. The control method of claim 14, wherein
    the determining of the target air density parameter comprises determining a lambda target parameter based on the engine speed parameter and the engine fuel parameter; and
    the lambda target parameter is indicative of a ratio between a stoichiometric air-to-fuel ratio and an actual air-to-fuel ratio.

16. The control method of claim 14, wherein
    the compressor pressure parameter is indicative of a pressure of the airflow at the compressor section; and
    the compressor temperature parameter is indicative of a temperature of the airflow at the compressor section.

17. A powerplant, comprising:
    an aircraft engine including a compressor section and a component configured to regulate airflow within the compressor section based on a control signal; and a control system configured to
- determine a lambda target parameter indicative of a ratio between a stoichiometric air-to-fuel ratio and an actual air-to-fuel ratio;
- determine the control signal using the lambda target parameter;
- determine a target air density parameter using the lambda target parameter;
- determine an actual air density parameter using a compressor pressure parameter and a compressor temperature parameter;
- compare the target air density parameter to the actual air density parameter to provide a difference parameter; and
- process the difference parameter to determine the control signal.

18. The powerplant of claim 17, wherein the control system is further configured to
- determine a target mass air parameter using the lambda target parameter, a stoichiometric air-to-fuel ratio parameter and an engine fuel parameter;
- determine an actual mass air parameter using the engine fuel parameter and an engine speed parameter; and
- process the target mass air parameter with the actual mass air parameter to determine the target air density.

* * * * *